United States Patent Office 3,194,757
Patented July 13, 1965

3,194,757
PROCESS FOR CLARIFYING RED MUDS
Edward J. Sullivan, Bay City, Mich., assignor to The Dow Chemical Company, Midland, Mich., a corporation of Delaware
No Drawing. Filed Feb. 16, 1962, Ser. No. 173,836
10 Claims. (Cl. 210—52)

This invention concerns the extraction of alumina from aluminiferous ores. More particularly, it relates to improvements in the clarifying of red mud slurries obtained by alkali leaching of aluminiferous ores.

According to present recovery methods, aluminiferous ores are slurried in a digester with a caustic solution and heated at an elevated temperature. The exact amounts of caustic used and the temperatures employed vary according to the ore being extracted. For instance, if the ore contains larger amounts of boehmite (alumina monohydrate) high caustic concentrations and temperatures are used in the digester. Gibbsite (alumina trihydrate), however, digests much more easily and, therefore, requires less forcing conditions. In any event, the ore is digested whereby the alumina values therein are solubilized in the presence of certain finely divided, insoluble residues characteristically having a red color as a result of the presence of iron values. The digested slurry is called a red mud. These red muds are extremely difficult to settle or otherwise clarify. At present, it is a common practice to employ soluble starch in the amount of about 0.5 to 1 percent by weight thereof based on the weight of mud solids settled.

The liquor obtained upon clarfiication of a red mud (referred to in the art as green liquor) is subsequently filtered to remove small residual amounts of insolubles and concentrated by evaporation. Having concentrated the liquid alumina extract, it becomes meta-stable and, upon seeding with alumina crystals, precipitation of alumina is induced therein. Amounts of precipitate obtained depend, as will be apparent to those skilled in the art, upon the degree of supersaturation, temperature of a liquor and the like variables.

In the foregoing process, it would be desirable, and it is an object of the invention, to provide means whereby the red mud slurries can be more effectively clarified. It is particularly desirable to increase the rate in which these slurries can be clarified and the stability of the resulting settled solids. In order to recover incorporated alumina values, the settled solids are normally washed and rewashed. In such washing operations it is desirable that the solids do not readily redisperse. The extent to which inert solids are taken up by the wash water and recycled to the beginning of the process represents a loss in process efficiency. Other objects and benefits of the invention will become apparent hereafter as the invention is more fully described.

In accordance with the invention, an improved process for the extraction of alumina values from digested aluminiferous ores comprises treating the digester effluent, red mud as it is called in the art, with a small but effective amount of a polyvinyl aromatic sulfonate characterizable as an essentially linear, water-soluble, ultrahigh molecular weight polymer flocculent.

For best results the polymer flocculents are employed in the form of a dilute aqueous solution containing from about 0.005 to about 1 percent by weight polymer solids preferably from about 0.05 to about 0.2 percent by weight polymer solids. The amount of polymer applied to a red mud can vary from as little as that required to produce significant settling rates, e.g., about 0.05 pound per ton of dry, insoluble solids, up to as much as about 4 pounds per ton of dry, insoluble solids. The red muds normally contain from about 0.5 to about 6 percent by weight of insolubles (dry basis).

Application of the polymer flocculents is accomplished by pouring, spraying or otherwise admixing a suitable solution of the polymer with a red mud slurry to be clarified. Desirably, agitation is sufficient to promote efficient mixing but care should be taken to avoid excessive shearing forces which would tend to disperse the flocculated solids. For example, suitable agitation is provided by stirring the treated slurry with large paddles or by passing it over cascading surfaces.

Basically, the polyvinyl aromatic sulfonates used are resinous materials corresponding to vinyl polymers having integrally and chemically combined therein a plurality of vinyl aromatic sulfonate moieties. Usually at least about 85 percent of the recurring moieties in said vinyl polymer are the polymerized form of the sulfonate monomer. More particularly, the polyvinyl aromatic sulfonates correspond to vinyl polymerization products of monomers characterized by the formula:

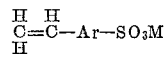

wherein Ar is a divalent monocyclic radical of the benzene series have its valences on nuclear, i.e., ring carbons, and M is hydrogen or any water-soluble salt-forming monovalent cation. Suitable salt forms include alkali metal, ammonium, amine and the like salt forms. The amines include, for example, primary, secondary and tertiary alkylamines wherein the alkyl may have from 1 to 4 carbons.

The polyvinyl aromatic sulfonate polymers to be employed herein are further characterized by a reduced viscosity number of at least about 17. Though an upper limit is not known, polymers having reduced viscosity numbers up to as much as about 52 are effective in the invention. These reduced viscosity numbers are believed to correspond to estimated weight average molecular weights of approximately 3.5 up to 12 million. Reduced viscosity ($N_r$) is defined by the following formula:

$$N_r = [(T/To) - 1]/C$$

wherein C is the concentration of the polymer sulfonate in grams per hundred milliliters of an aqueous 0.5 N sodium chloride solution, T is the flow time of the above sodium chloride solution having dissolved therein 0.4 gram of the polysulfonate and To is the flow time of the aqueous 0.5 N sodium chloride solution, said flow times being obtained with an Ostwald viscosimeter at 30° C.

The polyvinyl aromatic sulfonates are further characterizable by a flow index ratio of at least about 1.7. Polymers with flow index ratios up to as much as about 2.3 have been prepared and are effective. Flow index ratios are defined herein according to the formula:

$$n_b/n_w$$

wherein $n_b$ refers to the flow behavior index of a neutral solution of 0.25 percent by weight active polyvinyl aromatic sulfonate in 3 percent aqueous sodium chloride and $n_w$ refers to the flow behavior index of a neutral solution of 0.25 percent by weight active polyvinyl aromatic sulfonate in deionized water. These flow index numbers are computed in accordance with the following equation:

$$S = Kr^n$$

wherein K is a consistency index constant, $n$ is the flow index behavior (a measure of the degree of non-Newtonian behavior of the polymer in solution), $r$ is the rate of shear and S is the shear stress.

Individual flow behavior index numbers are evaluated by measuring the slope of a shear rate-shear stress plot for the polymer solutions described above on log-log graph paper. The required specific shear stress-shear rate data are obtained for the polymer solutions on a Fann viscosimeter at 25° C. after adjusting the pH of the solution to about 7 with 1 molar sulfuric acid or 1 molar sodium hydroxide as needed. Applied shear stress is obtained in units of pounds per 100 square feet and the shear rate is in units of reciprocal seconds. Since the applied stress equals a power function of the shear rate, the power being the flow behavoir index, the plot of the experimental data is a straight line, the slope of which is the flow behavior index. Flow index numbers obtained in this manner are then used to compute the flow index ratio ($n_b/n_w$).

While it is generally known that polyvinyl aromatic sulfonates can be prepared by the direct polymerization of vinyl aromatic sulfonate monomers or by the sulfonation of a polyvinyl aromatic backbone polymer, special techniques must be employed to obtain polymers with the aforementioned specifications. It is to be understood, however, that methods for the preparation of these polymers are not the subject of the present invention and freedom from possible patent domination of such methods is not to be inferred.

In the instance of the sulfonated polyvinyl aromatic polymers, the sulfonation reaction must be carried out in a manner such that little or no cross-linking occurs. An effective technique for accomplishing this reaction is that described by A. F. Turbak in a talk entitled "Polymer Sulfonation Without Cross-Linking; The $SO_3$-Phosphate System," given at the American Chemical Society National Meeting, St. Louis, Missouri, March 23, 1961. Normally, sulfonation to a degree of at least about 85 percent of the reoccurring moieties is sufficient for the purpose of providing a water-soluble polymer. Backbone polymers suitable for this purpose include polyvinyltoluenes, polystyrenes, poly-α methylstyrenes and the like polyvinyl aromatic backbone polymers. These backbone polymers must be of a sufficient molecular weight that when they are sulfonated, the resulting polymer has a reduced viscosity number of at least 17.

Though the sulfonated polymers are satisfactory, superior results are obtained with directly polymerized polyvinyl aromatic sulfonates. These can be obtained as vinyl polymerization products of such monomers as styrene sulfonic acid, sodium styrene sulfonate, potassium styrene sulfonate, sodium ar-vinyl tolyl sulfonate and the like. These polymers can be prepared in the following manner. The monomer and from about 3 to about 50 parts of water for each part of monomer are charged to a reaction system. A sufficient amount of alkali metal hydroxide to maintain the reaction system throughout the reaction at a pH of at least about 11 is added to the aqueous monomer solution.

Normally, the monomer and alkali metal hydroxide will be added to the reaction system in the form of an aqueous solution. Water incorporated into the reaction system therewith is considered to be a portion of the water to be charged as discussed above.

The excess alkali hydroxide used to maintain the reaction system at the specified pH level throughout the reaction will vary within the range from about 0.2 to about 20 percent based on the weight of the monomer. For best results, the excess alkali metal hydroxide should be within the upper regions of the aforementioned range when lower concentrations of the monomer are used and vice versa when higher concentrations of the monomer are used. What this means, is that having established a desired set of operating conditions yielding good results, comparable results can be expected by adjusting the composition of the charged reaction system in a manner such that with any changes in the amount of monomer charged (the amount of water remaining constant), the amount of excess alkali metal hydroxide used is also adjusted in an amount approximately inversely proportional to the change in the amount of monomer.

In carrying out the polymerization, oxygen in and above the reaction system is removed, as, for example, by subjecting it to a vacuum or by purging it with an inert gas such as nitrogen. Oxygen is removed from the reaction system until the atmosphere above it contains less than about 1.5 percent by weight oxygen. This step can be carried out at any convenient point during the charging of the reaction system, but it is usually accomplished subsequent thereto. The temperature of the reaction system is then increased to an effective level within the range from about 40° up to about 100° C. Under these conditions polymerization of the monomer occurs with the resulting production of an ultrahigh molecular weight polymer as specified above.

While it is not necessary for achieving polymerization, it is sometimes desirable to add a small amount of a chemical free radical catalyst. Addition of such a catalyst is suitably accomplished by adding small portions of the total catalyst desired at frequent intervals during the initial stages of the polymerization reaction. The maximum amount of free radical-forming catalyst that can be used is about 0.01 percent by weight of the monomer precursor used. While any of the water-soluble, free radical generating chemicals effective at the pH level specified can be used, it is preferred to employ salts of inorganic peracids such as sodium persulfate, potassium persulfate, sodium percarbonate, potassium percarbonate, sodium perborate, potassium perborate, sodium perphosphate, potassium perphosphate and the like. If desired, water-soluble activators can be utilized in conjunction with such catalysts. Examples of such materials are sulfur dioxide, alkali metal bisulfites, hydrosulfites, thiosulfates and sulfites.

It is desirable to conduct the polymerization reaction until about 80–90 percent of the charged monomer is converted to a polymeric product. Upon completion of the polymerization reaction, which may require from 5 to as much as 60 hours or more, the polyvinyl aromatic sulfonate is recovered by the reaction mass by means of conventional separatory techniques. An example of such techniques is precipitating the polymeric product with a non-solvent which may be a water-miscible organic liquid such as the lower aliphatic alcohols, esters, or ketones or mixtures thereof with water. Illustratively, the reaction mass is poured into methanol wherein soluble unreacted materials and reaction by-products are maintained in solution as the polymeric product precipitates.

A further aspect of the present invention involves the use of ligno sulfonates, such as are contained in the by-products of sulfite wood pulping processes, as activators for the polyvinyl aromatic flocculents of the invention. Normally, such ligno sulfonates are dispersants and would not be expected to have a favorable effect on the action of a fluocculent. It has been discovered, however, that small amounts of such ligno sulfonates employed in conjunction with the precipitants of the invention produce a substantially greater rate of flocculation and settling than that obtained by the employment of the polyvinyl aromatic sulfonate flocculents alone. For instance, the employment of from about 0.05 up to as much as about 2.0 pounds of a ligno sulfonate per tone of red mud insoluble solids (dry basis) treated with the polyvinyl aromatic sulfonate will increase the settling rates obtained as much as tenfold. The ligno sulfonate can be incorporated into the red mud at any stage in the operation, i.e., either before or after, or during, the addition of the polyvinyl aromatic sulfonate. Often the ligno sulfonate will be in the form of water-soluble salts, but it may also be employed as a free acid. As employed herein, ligno sulfonate means either acid or water-soluble salt forms thereof. Alkali metal and ammonium are common salt forms of the ligno sulfonic acids.

The ligno sulfonates utilized in the invention are contained in waste sulfite liquors, or concentrates obtained therefrom, that are by-products of the sulfite pulping of wood. Exemplary waste sulffite liquors are those obtained from calcium base pulping of soft- or hardwood, consolidated ammonium base pulping of soft- or hardwood and the like pulping processes. More particularly, the waste sulfite liquors are by-products of processes in which ligno cellulose materials are cooked in a solution of sulfurous acid and a sulfite salt of a pulping base cation such as sodium, calcium, ammonium or magnesium ions. Detailed information on the sulfite pulping processes is given in Hagglund, Chemistry of Wood, Chapter 5, Academic Press,. Inc., New York, New York (1951).

The general manner of carrying out the present invention and specific embodiments thereof are illustrated in the following examples. While these examples are illustrative of the invention, they should not be construed as limitations thereof.

EXAMPLE 1

The following experiments show the highly advantageous activity of the specified polyvinyl aromatic sulfonates as promoters of flocculation and settling in a red mud slurry. The red mud slurry used in these experiments had been prepared by a caustic digestion of Dominican bauxite. The digested liquor contained 32 grams per liter of insoluble residue (dry basis).

To 1,000 milliliter aliquot portions of the red mud slurry contained in standard 1,000 milliliter graduate cylinders and maintained at 90° C., was added effective amounts of various sodium polystyrene sulfonates. The polymers were added to the red mud slurry in the form of dilute aqueous solutions containing about 0.0125 percent by weight polymer solids. Particular polymers used were characterized by a flow index ratio above about 1.8 and a reduced viscosity number as specified below. Test results, along with polymer specifications and dosages, are set forth in Table 1 below. Runs 5 and 6 were made with sodium polystyrene sulfonate, whose reduced viscosity number was less than the essential minimum of the invention.

Table 1

| Run | Reduced viscosity number | Molecular wt. estimate (millions) | Polymer loading (lbs./ton) [1] | Settling rate, inches per minute [2] |
|---|---|---|---|---|
| 1 | 30 | 6.1 | 0.3 | 2.3 |
| 2 | 30 | 6.1 | 0.4 | 2.4 |
| 3 | 22.8 | 4.6 | 0.4 | 1.2 |
| 4 | 18.7 | 3.8 | 0.4 | 1.0 |
| 5 | 7.6 | 1.5 | 0.4 | ([3]) |
| 6 | 7.6 | 1.5 | 0.8 | 0.2 |

[1] Lbs./ton refers to amount of polymer used per ton of dry, red mud, insoluble solids.
[2] The settling rate is based on the time required for the clear supernatant-solids dispersion interface to settle to the 700 milliliter mark on the 1,000 milliliter graduate.
[3] Very slow.

EXAMPLE 2

In an operation similar to that of Example 1 the caustic digested Jamaican bauxite ore having about 3 percent by weight insoluble red mud solids is clarified by adding thereto a dilute aqueous solution of a sodium polystyrene sulfonate (SPSS) having a reduced viscosity number of about 25 and a flow index ratio above about 1.7. A sufficient amount of the polymer solution was employed to provide a polymer loading of 1 pound per ton of red mud solids. The results of this polymer treatment were compared with the effect achieved with 10 pounds of causticized starch per ton of red mud solids. The latter is the conventional flocculent of the industry. In both experiments, the red mud aliquots were contained in 1,000 milliliter graduates and the times recorded below are those required after treatment for the clear supernatant-solid dispersion interface to reach the indicated milliliter reading on the graduate.

Table 2

| Reading on graduate (milliliters) | Treatment | |
|---|---|---|
| | Causticized starch (minutes) | SPSS (minutes) |
| 1,000 | | |
| 900 | 4.2 | 0.2 |
| 800 | 5.1 | 0.3 |
| 700 | 5.8 | 0.4 |
| 600 | 6.7 | 0.6 |
| 500 | 7.7 | 1.5 |

EXAMPLE 3

In additional experiments, 1,000 milliliter aliquots of a red mud slurry contained in a 1,000 milliliter graduate were treated conjunctively in the following order with a ligno sulfonate containing product and a sodium polystyrene sulfonate (SPSS) similar to that employed in Example 2. The ligno sulfonate product was in the form of a concentrated waste sulfite liquor obtained as a by-product from the sulfite-calcium based cation pulping of wood. A representative sample of this product contained 51 percent soluble solids including about 6 percent total sulfur, about 20 percent reducing sugars and a balance of substantially ligno sulfonic acids. It was further characterized by a specific gravity of about 1.28 and a pH of 3.4. A sufficient amount of the liquor was employed to provide the amounts of the ligno sulfonate acids described below. The sodium polystyrene sulfonate was added to the red mud aliquots in the form of a dilute aqueous solution containing about 0.05 percent by weight polymer solids. Enough of this solution was utilized to provide the specified polymer loadings.

Upon addition of the sodium polystyrene sulfonate the red mud, solids settling was obtained as evidenced by the rapid descent of the clear supernatant-solid dispersion interface in the graduate cylinder. The rate of settling was computed in terms of feet per hour. The results of runs, with and without, the conjunctive use of the ligno sulfonate product are reported in the following table.

Table 3

| Run | Ligno sulfonate product [1] (dosage) [2] | SPSS (dosage) [2] | Settling rate (ft./hr.) [3] |
|---|---|---|---|
| 1 | None | 0.5 | 2.1 |
| 2 | 0.5 | 0.5 | 30.5 |
| 3 | 1.0 | 0.5 | 51.0 |
| 4 | 1.0 | None | ([4]) |

[1] The ligno sulfonate product contained only about 25 percent by weight of the active ingredient ligno sulfonic acid.
[2] Dosage is in pounds of the additive per ton of dry, red mud, insoluble solids.
[3] The settling rate is based on the time required for the clear supernatant-solids dispersion interface to settle to the 700 milliliter mark of the 1,000 milliliter graduate.
[4] No activity.

In still other experiments, sodium polystyrene sulfonate polymers characterized by a reduced viscosity number of about 40 and a flow index ratio of about 1.9 were employed to clarify a red mud obtained by the caustic digestion of Arkansas bauxite. The polymers were employed in the form of dilute aqueous solutions containing 0.2 by weight polymer solids. A sufficient amount of this solution was employed to provide a polymer loading of about 0.45 pound thereof per ton of insoluble red mud solids (dry basis). In several runs with the mentioned polymer and similar polymers, observed settling rates varied from 10 to as much as 24 or more feet per hour. Causticized starch employed in an amount of 10 pounds per ton of solids produced a settling rate of about 6.5 feet per hour.

What is claimed is:
1. In a process for clarifying red muds obtained by the alkali metal hydroxide digestion of aluminiferous ores, the improvement which consists in adding to the red mud a small but effective amount of an ultrahigh molecular weight polyvinyl aromatic sulfonate characterized by a reduced viscosity number of at least about 17 and a flow index ratio of at least 1.7.

2. A process as in claim 1 wherein the amount of the polyvinyl aromatic sulfonate employed is from about 0.05 to about 4 pounds thereof per ton of insoluble red mud solids to be flocculated and settled.

3. A process as in claim 1 wherein the polyvinyl aromatic sulfonate is added to the red mud in the form of an aqueous solution containing from about 0.005 to about 1 percent by weight polymer solids.

4. A method as in claim 1 wherein the polyvinyl aromatic sulfonate is an alkali metal polystyrene sulfonate.

5. A method as in claim 1 wherein the polyvinyl aromatic sulfonate employed is an alkali metal polyvinyltoluene sulfonate.

6. In a process for clarifying red muds obtained by the alkali metal hydroxide digestion of aluminiferous ores, the improvement which consists in adding to the red mud (1) from about 0.05 to about 3.0 pounds of a ligno sulfonate per ton of red mud solids to be settled and (2) a small but effective amount of an ultrahigh molecular weight polyvinyl aromatic sulfonate characterized by a reduced viscosity number of at least about 17 and a flow index ratio of at least about 1.7.

7. A process as in claim 6 wherein the amount of the polyvinyl aromatic sulfonate employed is from about 0.05 to about 4 pounds thereof per ton of insoluble red mud solids to be flocculated and settled.

8. A process as in claim 6 wherein the polyvinyl aromatic sulfonate is added to the red mud in the form of an aqueous solution containing from about 0.005 to about 1 percent by weight polymer solids.

9. A method as in claim 6 wherein the polyvinyl aromatic sulfonate is an alkali metal polystyrene sulfonate.

10. A method as in claim 6 wherein the polyvinyl aromatic sulfonate employed is an alkali metal polyvinyltoluene sulfonate.

References Cited by the Examiner

UNITED STATES PATENTS

| | | | |
|---|---|---|---|
| 2,280,998 | 4/42 | Brown | 23—143 |
| 2,740,522 | 4/56 | Aimone et al. | 210—54 X |
| 3,009,873 | 11/61 | Kerr et al. | 210—53 |
| 3,067,161 | 12/62 | Roth | 260—89.3 X |
| 3,085,853 | 4/63 | Lesinski et al. | 23—52 |

MORRIS O. WOLK, *Primary Examiner.*